HARRISON & SCHNITZER.
Photographic Lens.
No. 35,605.  Patented June 17, 1862.
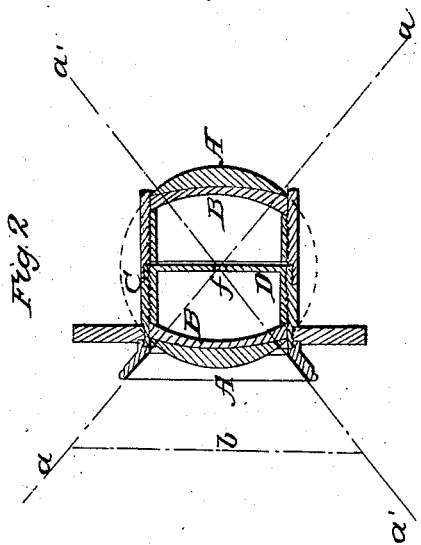
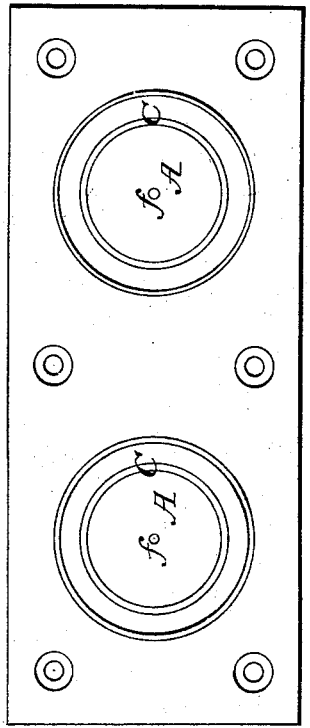
Witnesses
James Laird
R. Gawley.
Inventors
C. C. Harrison
Joseph Schnitzer

UNITED STATES PATENT OFFICE.

C. C. HARRISON AND JOSEPH SCHNITZER, OF NEW YORK, N. Y.

LENS FOR PHOTOGRAPHIC CAMERAS.

Specification forming part of Letters Patent No. 35,605, dated June 17, 1862.

*To all whom it may concern:*

Be it known that we, C. C. HARRISON and JOSEPH SCHNITZER, both of the city, county, and State of New York, have invented a new and Improved Lens for Photographic Cameras, &c.; and we do hereby declare that the following is a full, clear, and exact description of the same, reference being had to the accompanying drawings, forming a part of this specification, in which—

Figure 1 represents a face view of a set of our lenses as used for stereoscopic cameras. Fig. 2 is a longitudinal central section of one of the lenses.

Similar letters of reference in both views indicate corresponding parts.

To enable others skilled in the art to make and use our invention, we will proceed to describe it with reference to the drawings.

Our lens consists of two meniscus-shaped lenses, A, of crown-glass, each combined with a lens, B, of flint glass formed substantially as shown in Fig. 2 of the drawings, and arranged so that the outer surfaces of the crown-glass lenses A form a portion of a perfect sphere, as indicated by the dotted line in Fig. 2.

The several lenses are secured in a tube, C, in the ordinary manner, and they are separated from each other by a diaphragm, D, with a small central opening, $f$. The tube C ought to be so arranged that it does not project beyond the lenses on either end any farther than necessary for securing said lenses. The flint-glass lenses B are combined with the crown-glass lenses A for the purpose of rendering the same achromatic and a field flat and undistorted.

A lens of this construction with a focus of two inches and a half will give a perfect picture, and rays of light $a\ a'$, coming in at angles of ninety degrees, or nearly so, as indicated in red lines in Fig. 2, will pass through this lens unobstructed. When it is used for a photographic camera, for instance, it will give a true picture of all the objects inclosed within the lines $a\ a'$, or, more properly speaking, within the cone indicated by said lines; and if $b$ represents the object from which the picture is to be taken the part nearest to the ends of this line or nearest to the circumference of a circle represented by this line will be represented with equal sharpness and clearness as the parts nearest to the center of said line or circle, and at the same time the picture represented will show much more than a picture taken with an ordinary lens from the same distance.

The focus of ordinary lenses for photographic cameras cannot successfully be reduced below five inches, and the camera has to be removed to twice the distance in order to give a picture of all the objects which one of our new lenses will take in at half the distance, and it is obvious that the picture taken from the largest distance will be the least distinct. Our new lens may, however, be also applied with advantage to microscopes and to telescopes, and, in fact, it can be used in all cases when an achromatic lens is needed.

Having thus fully described our invention, what we claim as new, and desire to secure by Letters Patent, is—

The combination of two sets of cemented lenses, as represented in the accompanying drawings, the exterior surfaces of which shall form part of the same sphere, the axes of which shall be coincident, and the other curves of which shall be so proportioned to the focal distance of the combination and to the refractive and dispersive powers of the glass used in their construction that the image found at the focus shall be achromatic, and that said image shall be upon, or almost exactly upon, a plane without distortion of form and including a larger visual angle, substantially as hereinbefore described and represented.

C. C. HARRISON.
JOSEPH SCHNITZER.

Witnesses:
JAMES LAIRD,
EDW. W. HODGSON.